(12) United States Patent
Velde et al.

(10) Patent No.: US 7,265,870 B2
(45) Date of Patent: Sep. 4, 2007

(54) COLOUR SEPARATION METHOD

(75) Inventors: Koen Vande Velde, Duffel (BE); Paul Delabastita, Antwerp (BE)

(73) Assignee: Agfa Graphics NV, Mortsel (BE)

( * ) Notice: Subject to any disclaimer, the term of this patent is extended or adjusted under 35 U.S.C. 154(b) by 991 days.

(21) Appl. No.: 10/300,162

(22) Filed: Nov. 20, 2002

(65) Prior Publication Data

US 2003/0169438 A1 Sep. 11, 2003

Related U.S. Application Data

(60) Provisional application No. 60/336,634, filed on Dec. 4, 2001.

(30) Foreign Application Priority Data

Nov. 26, 2001 (EP) ................................ 01000662

(51) Int. Cl.
*B41J 1/00* (2006.01)

(52) U.S. Cl. ........................ 358/1.9; 358/515; 358/518; 358/525

(58) Field of Classification Search ................. 358/1.9, 358/518, 520, 523, 524, 525, 515; 382/162, 382/167
See application file for complete search history.

(56) References Cited

U.S. PATENT DOCUMENTS

| | | | | |
|---|---|---|---|---|
| 4,837,722 A | * | 6/1989 | Sara | 708/290 |
| 5,121,196 A | * | 6/1992 | Hung | 358/504 |
| 5,241,373 A | * | 8/1993 | Kanamori et al. | 348/645 |
| 5,268,754 A | * | 12/1993 | Van de Capelle et al. | 358/527 |
| 5,390,035 A | * | 2/1995 | Kasson et al. | 358/518 |
| 5,504,821 A | * | 4/1996 | Kanamori et al. | 382/167 |
| 5,581,376 A | * | 12/1996 | Harrington | 358/518 |
| 5,748,195 A | * | 5/1998 | Nin | 345/604 |
| 5,917,994 A | | 6/1999 | Perumal, Jr. et al. | |
| 6,304,671 B1 | * | 10/2001 | Kakutani | 382/167 |
| 6,571,010 B1 | * | 5/2003 | Inoue | 382/162 |
| 6,697,520 B1 | * | 2/2004 | Hemingway | 382/166 |

FOREIGN PATENT DOCUMENTS

EP 0 820 189 A2 1/1998

(Continued)

OTHER PUBLICATIONS

Po-Chieh Hung, "Smooth Colorimetric Calibration Technique Utilizing the Entire Color Gamut of CMYK Printers", Journal of Electronic Imaging, Oct. 1994, vol. 3, No. 4, pp. 415-424.

(Continued)

Primary Examiner—Thomas D. Lee
(74) Attorney, Agent, or Firm—Robert A. Sabourin

(57) ABSTRACT

Separation of a color into values for colorants in colorant space can be done easily when color correction and color separation are done in separate steps, where the color is defined as a set of values in a trajectory space, and trajectories include points for which ink behavior during color separation is known. Colorant values for the color are determined by interpolation using values of the color located in trajectory space, and known values and corresponding colorant values of the trajectory points. Trajectories are preferably color axes dividing the trajectory space into tetrahedral. Colorant values may be corrected using techniques such as colorant replacement or colorant splitting prior to color separation. The color separation process can be calibrated using a test target.

21 Claims, 12 Drawing Sheets

Color correction calibration via test chart

FOREIGN PATENT DOCUMENTS

| | | |
|---|---|---|
| EP | 0 833 500 A2 | 4/1998 |
| EP | 0 868 075 A2 | 9/1998 |
| EP | 896297 A2 * | 2/1999 |
| EP | 01 00 0662 | 3/2002 |
| JP | 9-284578 | 10/1997 |

OTHER PUBLICATIONS

James M. Kasson et al., "Performing Color Space Conversions with Three-Dimensional Linear Interpolation", Journal of Electronic Imaging, Jul. 1995, vol. 4, No. 3, pp. 226-249.

Tony Johnson, "Methods for Characterizing Colour Printers", Displays, vol. 16, No. 4, May 1996, pp. 193-202.

Alexander R. Harbury, "A Color-Corrected Halftone Algorithm for Bilevel Printers", SID International Symposium, Baltimore, May 1989, pp. 90-93.

Po-Chieh Hung, Colorimetric Calibration in Electronic Imaging Devices Using a Look-Up-Table Model and Interpolations, Journal of Electronic Imaging, Vol. 2, No. 1, 1993, pp. 53-61.

* cited by examiner

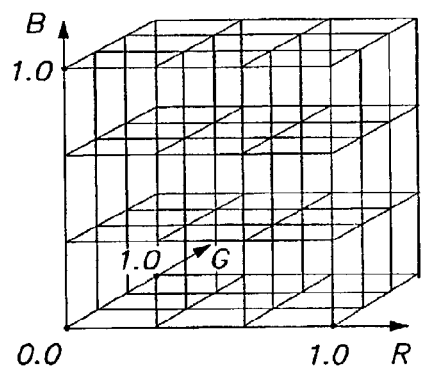
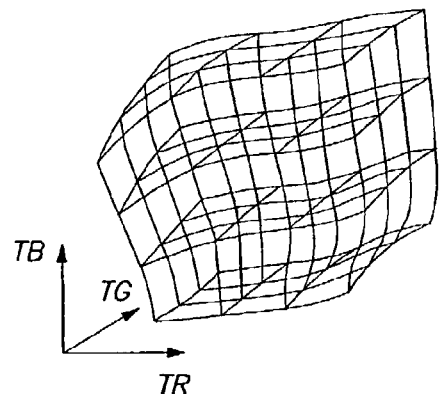
FIG. 16A    FIG. 16B
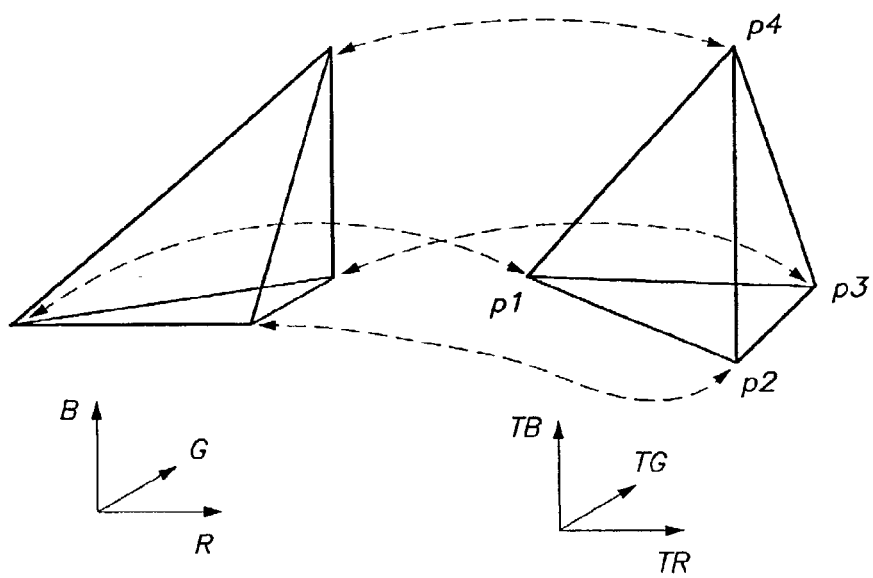
FIG. 17

COLOUR SEPARATION METHOD

The application claims the benefit of U.S. Provisional Application No. 60/336,634 filed Apr. 12, 2001.

FIELD OF THE INVENTION

The present invention relates to a method for separating a color into a plurality of values of colorants as used e.g. in printing in order to reproduce the color by using amounts of colorants corresponding to the colorant values.

More specifically the invention is related to color separation for a subtractive color reproduction processes and—more particularly—to a method for printing an image represented in a colorimetrically defined space such as for example sRGB by means of a set of subtractive colorants such as CMYK (cyan, magenta yellow and black).

BACKGROUND OF THE INVENTION

In order to calculate for every pixel the colorant values corresponding to the appropriate amounts of each colorant to faithfully render the color of that pixel different models have been described in the literature.

It is understood that in the description hereinafter the term colorant amounts can be considered as an equivalent to colorant values as for each output system the value delivered to the system will result in a certain amount of colorant to render the image.

As amounts of colorants can be considered colorants effectively applied to a substrate as known in printing processes both impact and non impact such as offset printing or inkjet printing, but also other equivalents can be understood. One of other possibilities is the use of electrographic printing processes. In photographic materials colorants are generated during development after exposure of the image to the material.

Different State of the Art Models:

Model Using Masking Equations

In "The reproduction of color" by R. W. G. Hunt (1987, Fountain Press England) and in the book "Principles of Color Reproduction" by John A. C. Yule (originally published in 1967 by Wiley & Sons, and reprinted in 2001 by GATFPress), it is explained that a set of 3×3 "masking equations" can be used to relate the CMY colorant densities with the density values in a photographic color original that is to be reproduced. The underlying concept is that the amounts of the individual colorants are adjusted so that the sum of the density of the main absorption of every colorant with the densities of the side-absorptions of the other two colorants matches the original density. Requiring this condition to be true for the RGB densities leads to the 3×3 linear equations that relate uncorrected and corrected RGB densities. The term "masking equations" refers to the original photographic masks that were used to implement this method. The masking equations enable to calculate the amounts of cyan, magenta and yellow colorants. When a color is to be reproduced of which the density is too high to be rendered with just these three colorants, black colorant can be added so that the density of the printed reproduction matches the density in the original. Many variations exist on the above approach.

A first class of variations relates to the way the amount of black colorant is calculated. By calculating first the equivalent neutral density of the desired color, then reducing the amounts cyan, magenta yellow colorants appropriately and replacing this neutral component by an equivalent amount of black colorant, in principle the same color is obtained but with a lower total amount of colorant, since the black colorant replaces three colorants. This technique is called "under color removal" (UCR) or "gray component replacement" (GCR).

A second class of variations relate to the masking equations themselves. Since with 3×3 masking equations only 3 colors can be exactly corrected, higher order terms are usually added to improve their precision. By doing so, exact compensation can be obtained for more colors. The approach that is usually taken, however, is to minimize the root mean square error of the reproduction process over the gamut of printable colors. This is achieved by first printing a large set of color samples, and then using a numerical regression technique to calculate the optimal set of coefficients of the extended masking equations.

Color separation techniques based on the masking equations were a popular approach in the analog color scanners that were developed in the nineteen seventies and eighties, because they could be relatively easily implemented using analog electronic circuitry.

Color separation techniques based on the masking equations suffer from certain limitations. From a theoretical viewpoint, they describe a density modulation based reproduction process. Examples of such processes are the silver-based photographic process or thermal dye sublimation processes. Many print reproduction processes, however, do not work by directly modulating the densities of colorants, but rather by modulating the size of halftone dots (in the case of amplitude modulation halftoning) or the number of fixed sized halftone dots per unit area (in the case of frequency modulation halftoning). The color mixing behavior is rather different for such processes, due to the complex optical and physical interactions between the halftone dots, the light, and the substrate. This explains why the model of the masking equations is not very accurate to control color separation in halftoning based print reproduction processes and that the determination of the optimal coefficients for such processes requires substantial skill and effort.

Model Using Neugebauer Equations

Based on the fact that the halftone dots of 4 different colorants produce only 16 possible distinct combinations of overlap, and on the assumption that the relative position of the halftone dots can be considered random (an assumption that is closely approximated in most real printing conditions), the Neugebauer equations predict the tristimulus values of a color as a function of the effective CMYK dot areas. A detailed explanation of the Neugebauer equations is found in the book "Principles of color Reproduction" by Yule and in the article "Inversion of the Neugebauer Equations" by Marc Mahy and Paul Delabastita in the magazine color Research and Application (published by John Wiley & Sons Vol. 21, nr. 6, December 1996). In the latter article, various interpretations are given to the original Neugebauer equations, as well as a method to improve the accuracy of the model by localizing the coefficients. The localized Neugebauer coefficients are obtained by printing a test chart with the colorant values laid out on a four-dimensional grid, and measuring the resulting colors. By solving sets of equations, the coefficients are determined so that the colors of the test chart are exactly predicted by the Neugebauer equations. Other approaches for improving the accuracy of the Neugebauer equations that are not discussed in the article consist of adding higher order terms to the original equations or increasing the number of color channels from three tristimulus values to a more accurate sampling of the visible spectrum.

Since the Neugebauer equations predict color as a function of colorant values, they need to be inverted in order to solve the color separation problem. The article by Mahy and Delabastita continues by disclosing that—for the three colorant case—this can be achieved by using a three-dimensional Newton-Raphson iterative process or—preferably—by first converting the Neugebauer equations into a $6^{th}$ degree polynomial of which the six roots are easily determined using robust numerical techniques. Of the six solutions, the one that has a physical interpretation is selected and used to separate the color into the colorants.

The article finishes by pointing out that the method can be extended to the four colorants case, by considering one of the colorants (for example the amount of black colorant) as a parameter of the equations. Effectively, this means that for a given color, the amount of black colorant has to be determined based on some criterion, after which the cyan, magenta and yellow values are determined by inverting the Neugebauer equations. The article does not give hints on how the black colorant parameter should be selected.

In practice, it is not straightforward to come up with a good black colorant generation strategy for the purpose of separating a color into four colorants. In theory it is even impossible to invert a transformation from the four-dimensional colorant space to the three-dimensional color space, since multiple ink combinations yield exactly the same color. Hence, in order to solve this undetermined problem additional constraints are to be imposed.

A first requirement is obviously that for the rendering of an individual pixel with a given printable color, there is a minimum and a maximum amount of black colorant that can be used to print that pixel, and that the selected amount of black ink should fall in between these two extremes. Considerations that help to make the selection comprise: the maximum total amount of colorant that the printing process supports for printing a pixel, robustness of the color balance in the presence variations of the amounts of colorants due to printer instability, visibility of moiré or graininess due to the geometrical interactions between the halftoned separations, metameric robustness if different light sources or viewing conditions are anticipated, etc. . .

The problem becomes even more complicated when additional constraints are imposed on how the colorants are allowed to change along certain trajectories in color space. For example it is considered desirable—if not mandatory—that the amounts of colorant change monotonously along the neutral axis and along the axes from the dark neutral point to the primary (cyan, magenta and yellow) and secondary (red, green and blue) subtractive primaries.

The reason why it is so difficult to fit all the constraints with the four-dimensional Neugebauer equations is because the management of color and colorants are compounded in one single model. No strategies are available to our knowledge that are simple and robust, and enable to separate the color and colorant management problems when using the Neugebauer equations. The complexity becomes even worse when more than four inks are used for printing, for example, when in addition to the standard CMYK colorants also a light cyan and light magenta colorant is used to reduce halftone graininess in the highlight tones.

Models Using Look-Up Tables and Fast Interpolation

Most mathematical models to calculate the amounts of colorants to render a given color require too many computations for the purpose of directly separating all the pixels in an image. For this reason look-up-tables are usually employed in combination with three-dimensional interpolation. The look-up-tables are first populated off-line using the complex separation models. Performing interpolating techniques in combination with these look-up tables enable fast separation of large images. An example of such an interpolation technique is described in U.S. Pat. No. 4,334,240. Other articles that discuss the use of look-up tables and interpolation are "Tetrahedral Interpolation Algorithm Accuracy" by J. M. Kasson, Proc. SPIE 2170, 24 (1994) and "Comparisons of Three-Dimensional Interpolation Techniques by Simulation" by H. R. Kang, Proc. SPIE 2414, 104 (1995).

OBJECTS OF THE INVENTION

It is one of the objects of the invention to have a method to separate color represented by a set of values into values or amounts of colorants, which is precise but neither requires great skill nor effort to calibrate.

It is another object of the invention to provide a color separation method that enables to control the constraints on the relative amounts of the colorants in different parts of the printable color gamut in a simple and robust way.

It is another object of the invention to provide a color separation method that enables to achieve monotonousness of the amounts of colorants or values for colorants in colorant space along certain trajectories defined in a trajectory space which can be a (intermediate) color space.

It is a further object of the invention to provide a color separation method that requires fewer calculations than e.g. when using the inversion of the Neugebauer equations.

SUMMARY OF THE INVENTION

The above mentioned objects are realized by a method having the specific features according to claim 1. Specific features for preferred embodiments of the invention are set out in the dependent claims 2 to 7 and 19-22.

Further advantages and embodiments of the present invention will become apparent from the following description and drawings.

BRIEF DESCRIPTION OF THE DRAWINGS

FIG. 16A gives a representation of the print stimulus in the trajectory space.

FIG. 16B gives the resulting measured print response in a colorimetric tristimulus space obtained by printing with colorant values obtained for the print stimulus in trajectory space.

FIG. 17 shows the mapping of a tetrahedron in the trajectory space onto a tetrahedron in the colorimetric tristimulus space and vice versa.

DETAILED DESCRIPTIONS AND PREFERRED EMBODIMENTS OF THE INVENTION

In order give to provide a solution to the basic problem of respecting the printable gamut during color separation of the three-dimensional color space to N-dimensional colorant space following method is used.

As mentioned above it is difficult to fit all the constraints imposed by a good separation strategy with the four-dimensional Neugebauer equations, because the management of color, i.e. color correction and separation into colorants are compounded in one single model that is not separable.

Figure 1:
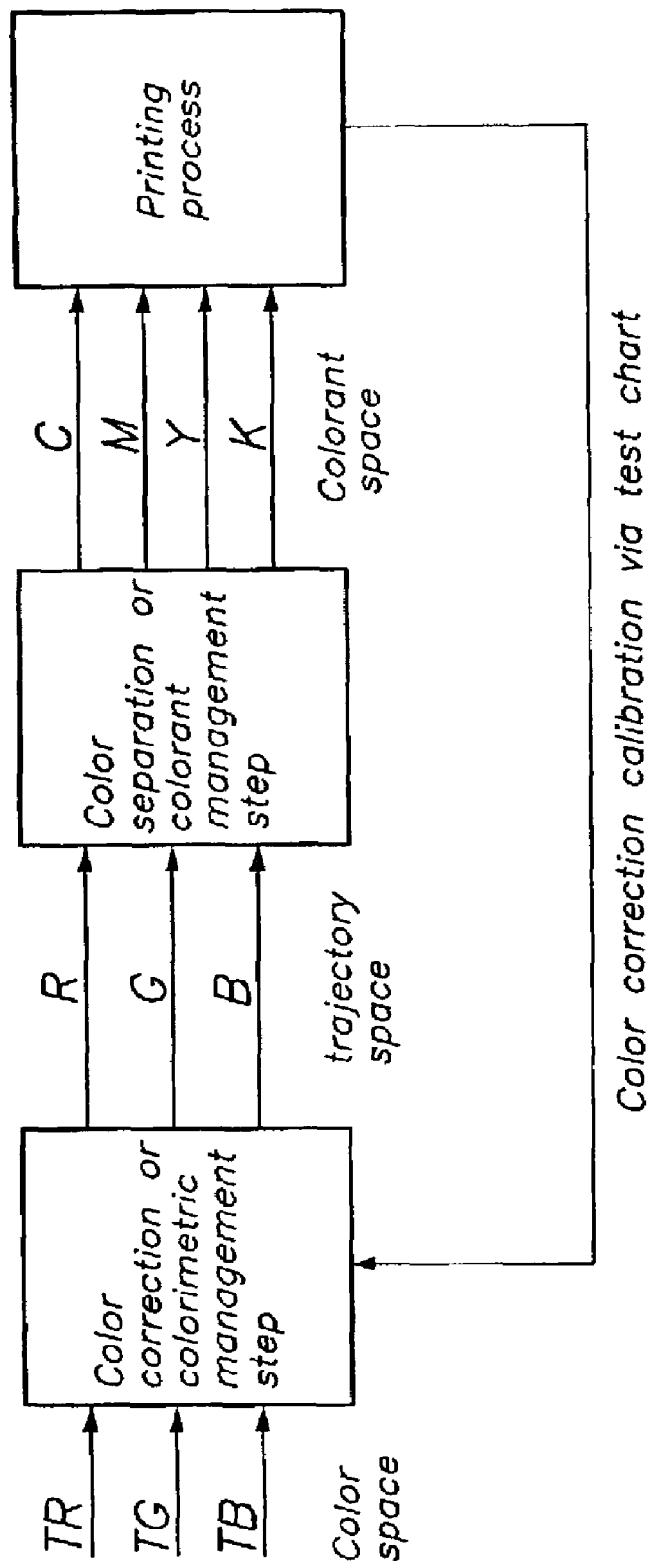
FIG. 1 gives a basic schematic overview of the new method for color separation.

The method is based upon separation the color correction and the separation into values of colorants into two separate models that can be easily separately controlled as indicated in FIG. 1. The new method is based on defining a trajectory space which can be e.g. an intermediate non-colorimetric RGB-color space.

Maximum control of separation into colorants is achieved by defining at least two trajectories in the trajectory space along which the values for colorants needed for reproduction of the points on the trajectories are directly controlled as a function of position in the trajectory space. By doing so, the three-dimensional problem is essentially reduced to a set of one-dimensional problems that are easier to manage. Because the values for colorants are directly controlled, it is easy to meet separation constraints such as the relative value for the black colorant compared to the non-black colorants and a maximum total value of colorants, corresponding to a total amount of colorants, which also can be an important constraint. It is also possible to define any number of colorants along the trajectories, so that printing processes with more than four colorants are easily supported by the new method. Because it is possible to define any number of trajectories in the trajectory space, virtually unlimited control is achieved over the colorants throughout the printable color gamut. Three-dimensional interpolation is used for calculating the values of colorants for co-ordinates that do not lie on a trajectory in the trajectory color space. The only restriction in the colorant management step is that the co-ordinates of all the points in the trajectory space should yield unique printed colors, but this is a rather trivial condition for well-behaved printing processes.

Additionally, color correction or colorimetric management in the new method is obtained by printing out a test chart using known co-ordinates in the trajectory space, then measuring the colorimetric co-ordinates of the printed colors and finally to invert the relation between the two three-dimensional spaces. The co-ordinates of the test colors can be ordered (i.e. laid out on a regular three-dimensional grid in the trajectory space) or they can be non-ordered. The modeling between the two three-dimensional spaces is achieved using a set of three three-dimensional polynomials (one of the variations of the three-dimensional Neugebauer equations) or a three-dimensional triangulation such as, for example, a Delaunay triangulation. A Delaunay triangulation is a subdivision of a volume into tetrahedrons with the property that the circumsphere of every tetrahedron does not contain any points of the triangulation Since these models map a three-dimensional source onto a three-dimensional domain, inversion is relatively straightforward—provided of course that the relation is invertible to begin with, which condition is met if the colorant management step, i.e. color separation, was appropriately carried out.

By having separated colorimetric management, i.e. color correction, and colorant management, i.e. color separation, excellent control is possible over the colorant values, and thus amounts of colorants, so that the colorant constraints can easily be met, while the color management via the external loop achieves the required colorimetric accuracy.

Just as with existing color separation technologies, preferably three-dimensional look-up tables are populated with the new method and employed in combination with interpolation for the purpose of separating large images.

PREFERRED EMBODIMENT OF COLORANT GENERATION STEP FOR FOUR COLORANTS:

CMYK

Figure 2:
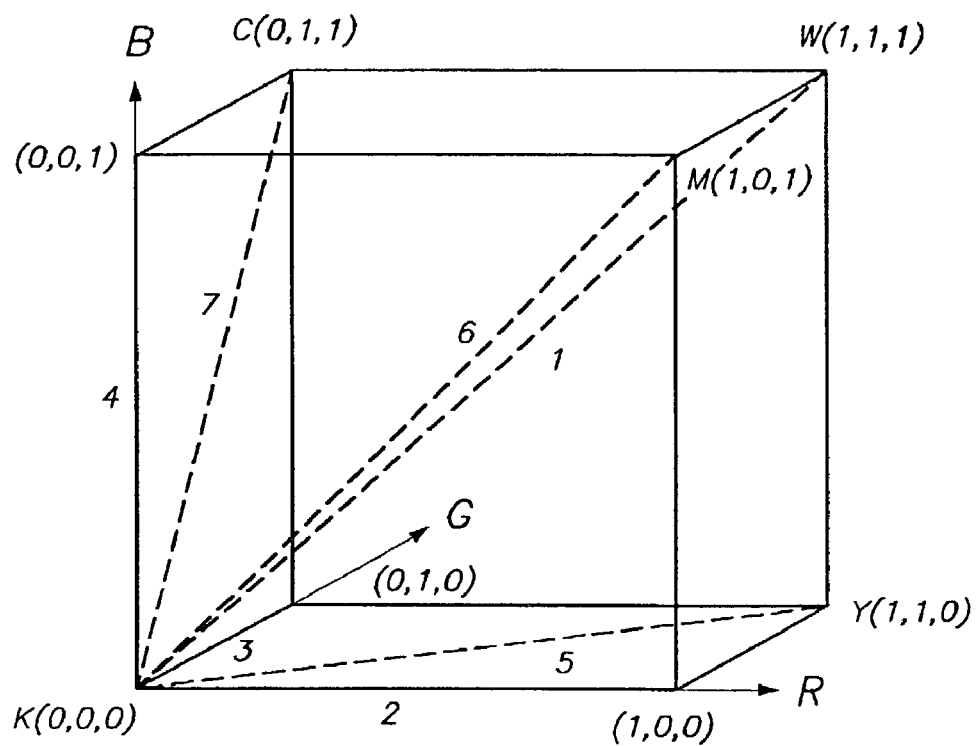
FIG. 2 is a representation of the trajectory (RGB color) space and seven axes.
Figure 3B:
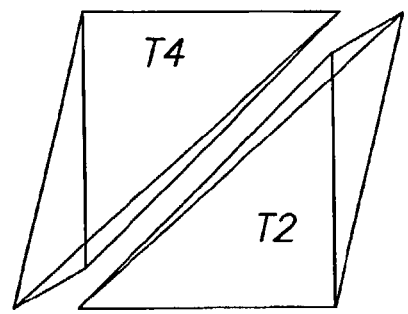
FIG. 3B shows tetrahedrons T2 (K,W,R,M) and T4 (K,W,G,C).
Figure 3A:
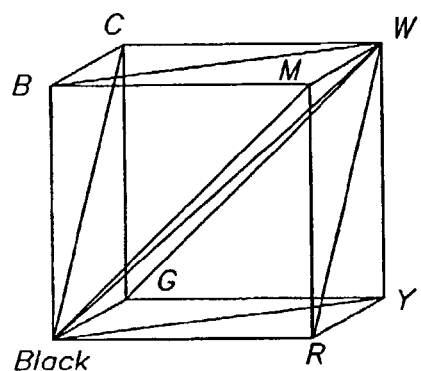
FIG. 3A shows the seven axes dividing the trajectory space into six non-overlapping tetrahedrons.
Figure 3C:
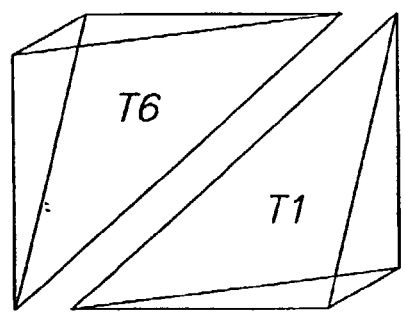
FIG. 3C shows tetrahedrons T1 (K,W,R,Y) and T6 (K,W,B,C).
Figure 3D:
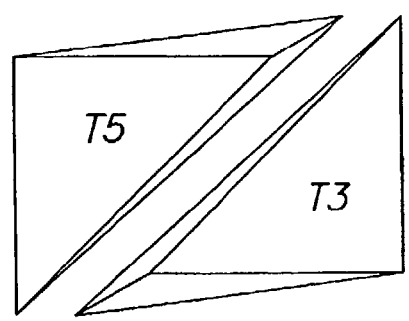
FIG. 3D shows tetrahedrons T3 (K,W,G,Y) and T5 (K,W,M,B).

The following description is given in reference to FIG. 2. First a trajectory space of which the R, G and B values range from 0.0 to 1.0 is defined. The base vectors (1,0,0), (0,1,0) and (0,0,1) in trajectory space represent the colors of the double overprints of magenta with yellow, cyan with yellow and cyan with magenta colorants respectively. The vectors with co-ordinates (0,0,0) and (1,1,1) correspond with the darkest and lightest printable neutral color. The colors with co-ordinates (0,1,1), (1,0,1) and (1,1,0) represent the colors of the cyan, magenta and yellow colorants respectively.

Ink behavior along seven different trajectories or axes in the trajectory space is defined:
1. The neutral axis, connecting black (0,0,0) and white (1,1,1)
2. The red axis, connecting black and red (1,0,0)
3. The green axis, connecting black and green (0,1,0)
4. The blue axis, connecting black and blue (0,0,1)
5. The yellow axis, connecting black and yellow (1,1,0)
6. The magenta axis, connecting black and magenta (1,0,1)
7. The cyan axis, connecting black and cyan (0,1,1)

The seven axes naturally divide the RGB cube in trajectory space into 6 non-overlapping tetrahedrons as is exemplified by FIG. 3A to 3D. It can be seen that for each tetrahedron three axis span the volume of the tetrahedron:

T1 = {(0, 0, 0), (1, 0, 0), (1, 1, 0), (1, 1, 1)}, spanned by the neutral 1, red 2, and yellow 5 axes, and characterized by R ≧ G ≧ B.
T2 = {(0, 0, 0), (1, 0, 0), (1, 0, 1), (1, 1, 1)}, spanned by the neutral 1, red 2, and magenta 6 axes, and characterized by R ≧ B ≧ G.
T3 = {(0, 0, 0), (0, 1, 0), (1, 1, 0), (1, 1, 1)}, spanned by the neutral 1, green 3, and yellow 5 axes, and characterized by G ≧ R ≧ B.
T4 = {(0, 0, 0), (0, 1, 0), (0, 1, 1), (1, 1, 1)}, spanned by the neutral 1, green 3, and cyan 7 axes, and characterized by G ≧ B ≧ R.
T5 = {(0, 0, 0), (0, 0, 1), (1, 0, 1), (1, 1, 1)}, spanned by the neutral 1, blue 4, and magenta 6 axes, and characterized by B ≧ R ≧ G.
T6 = {(0, 0, 0), (0, 0, 1), (0, 1, 1), (1, 1, 1)}, spanned by the neutral 1, blue 4, and cyan 7 axes, and characterized by B ≧ G ≧ R.

Concentrating first on T1, which is the tetrahedron spanned by the neutral 1, the red 2 and the yellow 5 axes.

It is hereinafter explained how the colorant management or color separation is done for this tetrahedron T1.

Except for the black point (0,0,0), the corresponding colorant values in colorant space of the end-points of these axes are actually already determined by the way the trajectory space was defined. Indeed, white (w) is obviously printed with no ink at all. Yellow (Y) is printed with 100% of the yellow colorant and red (R) is printed with a combination of 100% of both the yellow and magenta colorants.

The situation is not so obvious for the dark neutral point (Black). In most printing processes, the dark neutral color is the one that requires the largest total amount of colorant. This point is hence critical with regard to the possible constraints.

E.g. in a representative printing process the maximum amount of colorant, and thus the sum of colorant values in colorant space, is, for reasons of colorant absorption limitations, restricted to 280%. It can be experimentally verified that for such a representative printing process the darkest neutral color that contains 280%. of colorant, is obtained by printing a combination of 100% black ink with approximately of 70% cyan, 60% magenta and 50% yellow colorant.

Small deviations from neutrality of the color are not important at this point, since besides the colorant management step a color management step or color correction can be provided. That is why an experimental procedure is sufficient to determine the values for this point.

After determining the CMYK values for the end-points of the neutral, cyan and blue axes, curves are given defining how the colorant values in colorant space change along the trajectory between these end-points. There are a few considerations when defining these curves, most of them dealing with trade-offs.

Take for example the red axis. According to the example above, the colorant behavior is determined by four curves, one curve for each colorant of the CMYK system. For this axis following values are known:

| | | | |
|---|---|---|---|
| Cyan curve | starting at 0.7 | (black point) | to 0.0 (full red), |
| Magenta curve | starting at 0.6 | (black point) | to 1.0 (full red), |
| Yellow curve | starting at 0.5 | (black point) | to 1.0 (full red) and |
| Black curve | starting at 1.0 | (black point) | to 0.0 (full red). |

Several options exist to construct a continuous curve to connect the starting point to the end-point.

Figure 4:
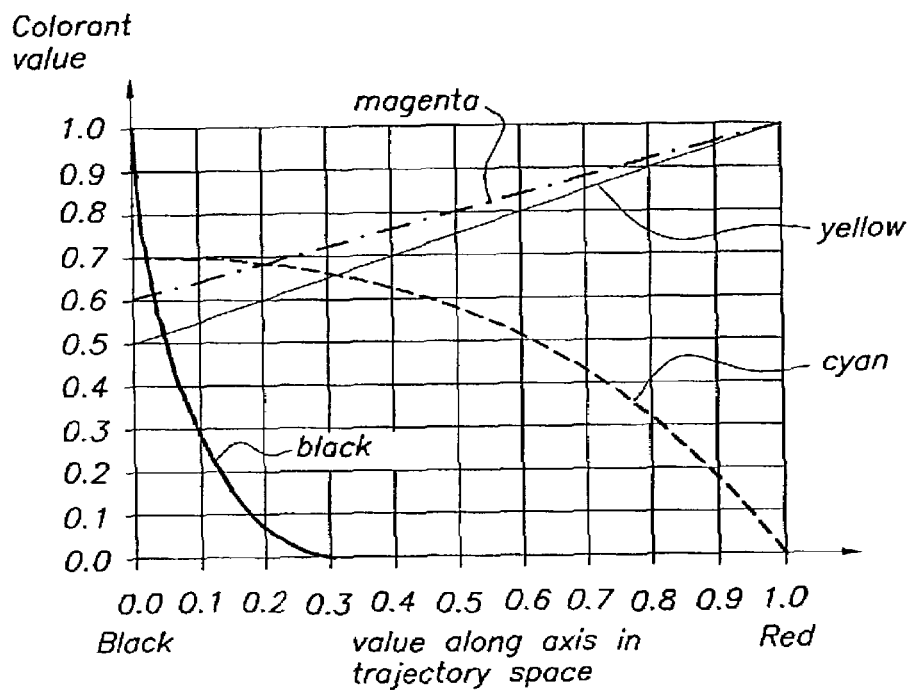
FIG. 4 depicts a first set of colorant curves describing colorant values when following in trajectory space a trajectory from black to red ("red axis") where the use of black colorant is low.

According to a first strategy, shown in FIG. 4. In FIG. 4 the horizontal axis represents the value along the axis in trajectory space while the vertical axis indicated the colorant value for the colorants used to represent the color in trajectory space. It Can be seen that the darkening of the red color from maximum red intensity to black (right to left) is achieved primarily by increasing the cyan colorant value, leaving the black colorant at low values except near the very darkest neutral where it is forced to sharply increase so that it reaches its end-value of 100% black colorant. Since the addition of cyan colorant not only darkens a red color, but also desaturates it, this strategy will somewhat restrict the color gamut that is achieved.

Figure 5:
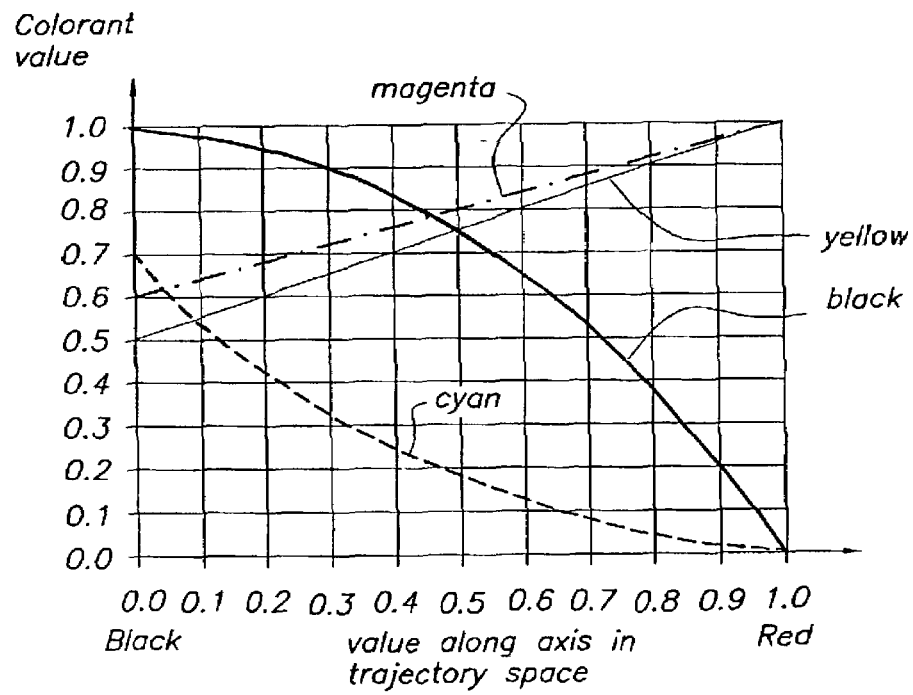
FIG. 5 shows a second set of colorant curves describing colorant values when following in trajectory space a trajectory from black to red ("red axis") where the use of black colorant is high.

A second possible approach for defining colorant behavior along the red axis is illustrated in FIG. 5 and consists of darkening the red color primarily by adding black colorant. Using this approach addresses the theoretically achievable color gamut more optimally, but the trade off now is that, in the case of halftone printing, the black separation introduces potentially disturbing geometrical interferences with the cyan and magenta separations, leading to increased graininess and moiré. The exact shapes merely represent different options and trade-offs. Whatever strategy is used, it is obvious that the requirement of monotonousness along a degrade from red to dark neutral is easily met, simply by defining monotonous curves between the end-points. The constraint of the maximum total amount of colorant or maximum sum of values is also easily achieved, because at each point along the trajectory from red to dark-neutral, the total amount of colorant can be calculated and the separation curves are easily set in a way that this limit is nowhere exceeded.

Figure 6:
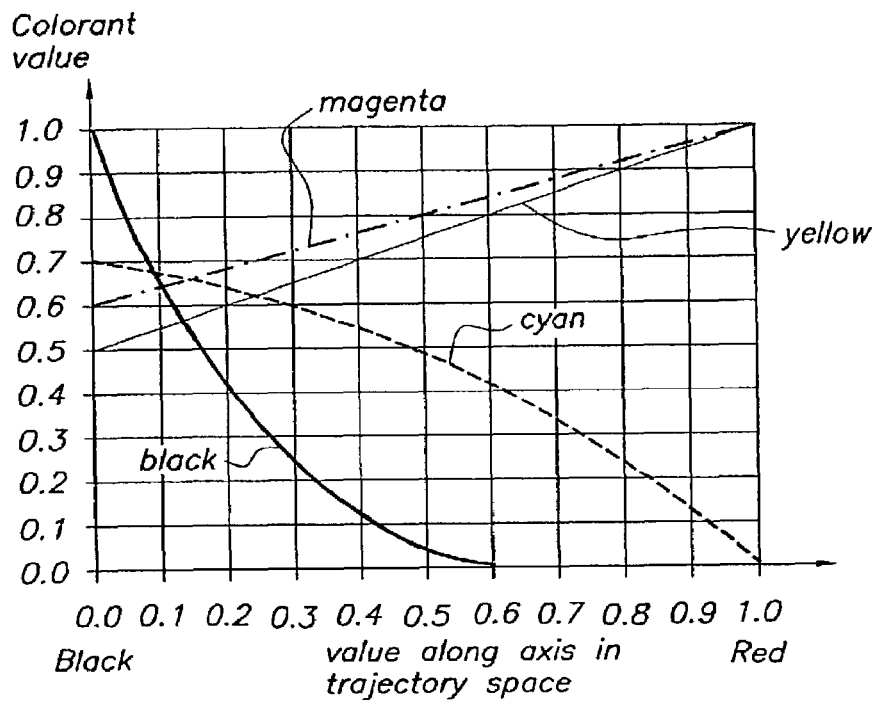
FIG. 6 gives a third set of colorant curves describing colorant values when following in trajectory space a trajectory from black to red ("red axis") where the use of black colorant is average.

A third possibility is illustrated in FIG. 6 where the use of the black colorant is average when darkening from red to black.

Figure 7:
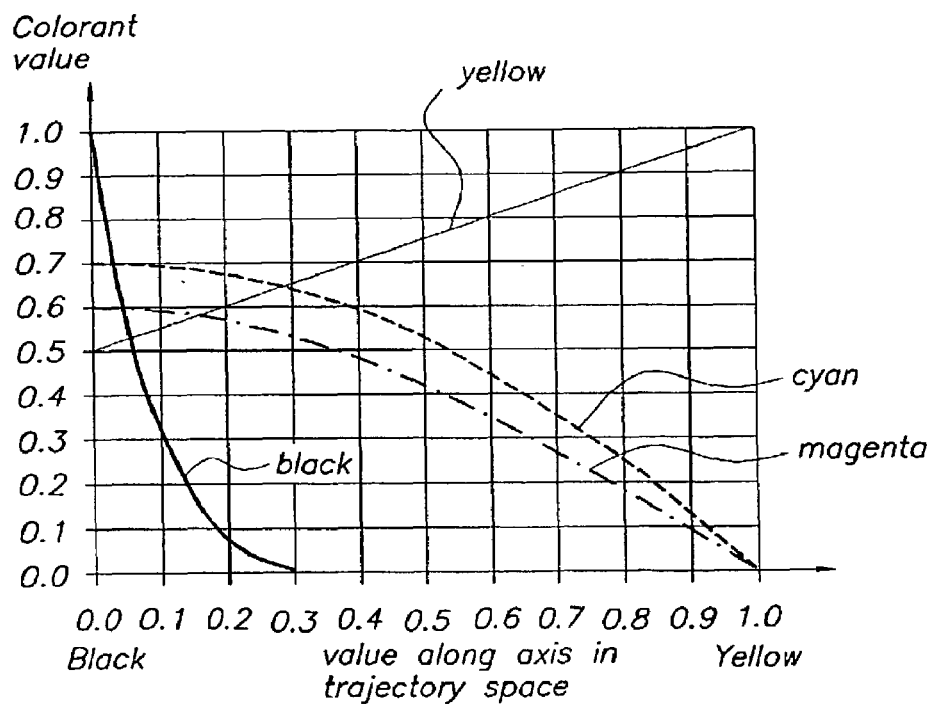
FIG. 7 shows a set of colorant curves describing colorant values when following in trajectory space a trajectory from black to yellow with a low use of black colorant.

A similar reasoning can be made for the yellow axis. The trade-off will not necessarily be the same. For the yellow axis, for example, it may very well be more important to minimize moiré and graininess than to optimize color gamut. In FIG. 7, a possible definition for the separation curves for the black to yellow axis is shown.

Figure 8:
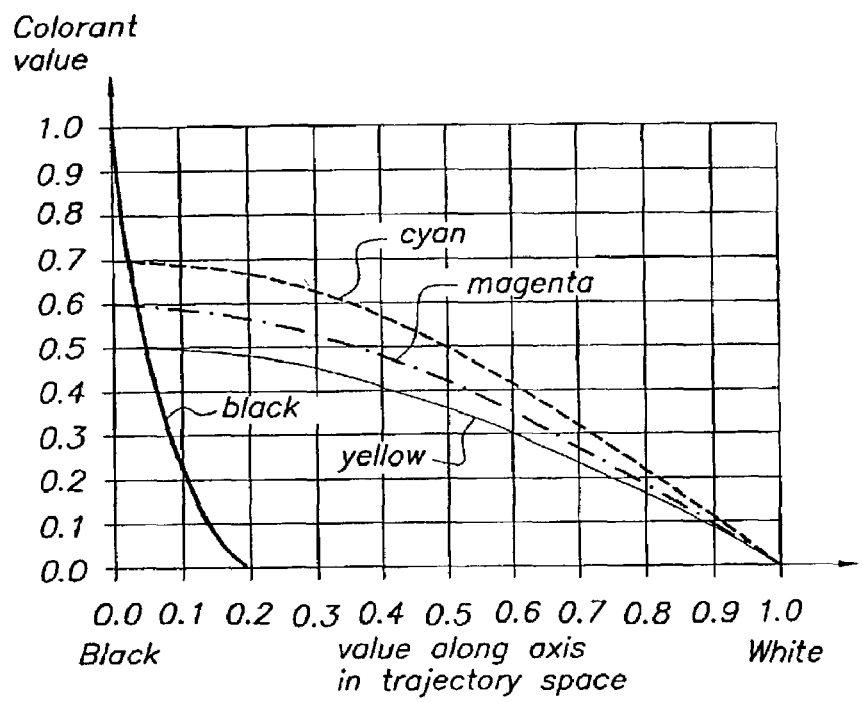
FIG. 8 gives second set of colorant curves describing colorant values when following in trajectory space a trajectory from black to white ("neutral axis") where the use of black colorant is high.
Figure 9:
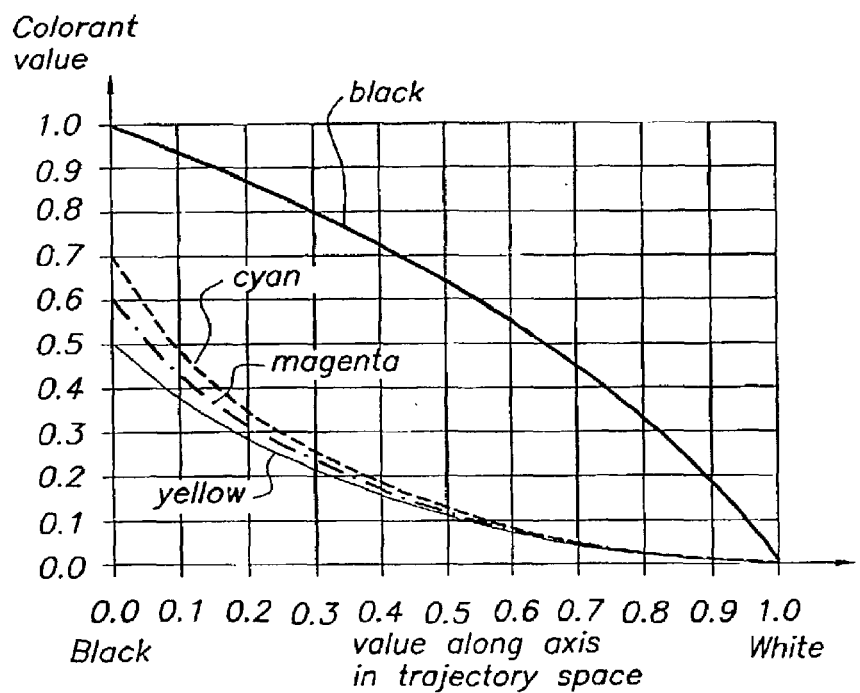
FIG. 9 shows a first set of colorant curves describing colorant values when following in trajectory space a trajectory from black to white ("neutral axis") where the use of black colorant is low.
Figure 10:
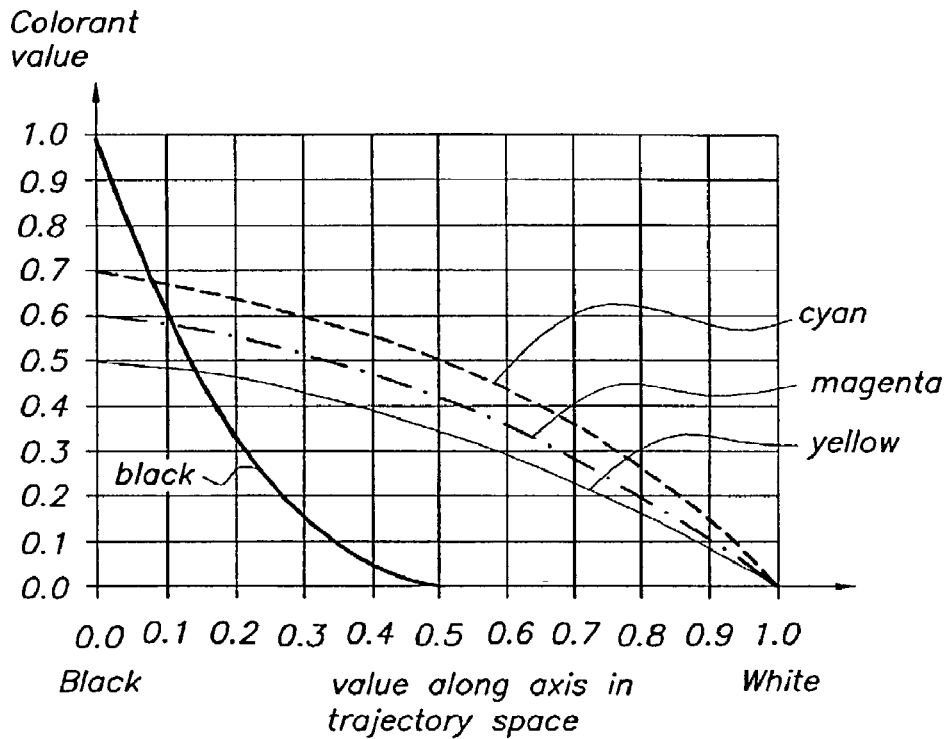
FIG. 10 shows a third set of colorant curves describing colorant values when following in trajectory space a trajectory from black to white ("neutral axis") where the use of black colorant is average.

The colorant behavior along the neutral axis is a special case. There is the option to print a neutral color primarily with a combination of cyan, magenta and yellow inks as depicted in FIG. 8 or to use primarily the black colorant as illustrated in FIG. 9. The second approach leads to a more robust color balance in the presence of instability of the printing process and to a lower average ink consumption, but because the black ink causes stronger interferences with the other separations, the near-neutral colors will appear more grainy and moiré will be more apparent. A lower use of the black colorant as illustrated in FIG. 8, on the other hand, increases the total ink consumption and makes the color balance more affected by printer instability, but results in softer and less grainy tints. In most practical cases, preferably a strategy is selected that lies somewhere in between the two above strategies, such as for example the CMYK curves depicted in FIG. 10.

Having now defined the CMYK colorant values in colorant space along the red, yellow and neutral axes of tetrahedron T1 spanned by one axes in trajectory space, the next problem to be solved is how to calculate the values for the colorants for a point that falls inside the tetrahedron T1. For this purpose, following method can be applied which is first explained graphically and then supported by means of numerical formulas.

Figure 11:
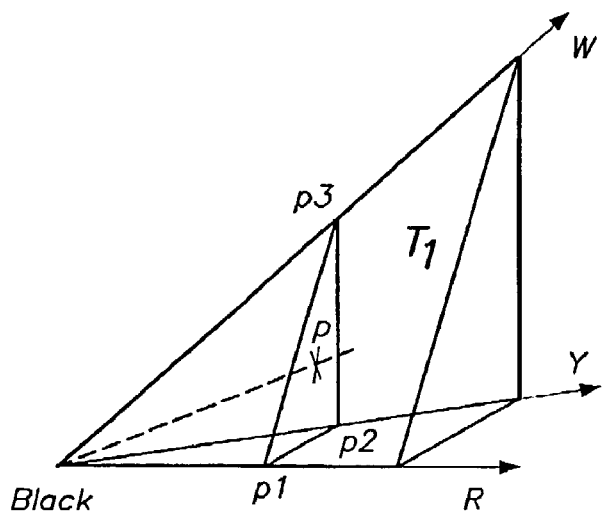
FIG. 11 illustrates an explanation of interpolation of CMYK colorant values for the point p.

The point p in FIG. 11 is situated in the tetrahedron T1. First a plane is constructed that is parallel to the plane defined by the points R, Y and W, and the values in trajectory space for the trajectory points forming the intersection p1, p2 and p3 of the plane with the red, yellow and neutral axes are calculated. For each of these three trajectory points p1, p2 and p3 it is possible to obtain corresponding CMYK colorant values $C_1M_1Y_1K_1$, $C_2M_2Y_2K_2$ and $C_3M_3Y_3K_3$ (generally $C_xM_xY_xK_x$) from the separation curves e.g. shown in FIGS. 6, 7 and 10.

Figure 12:
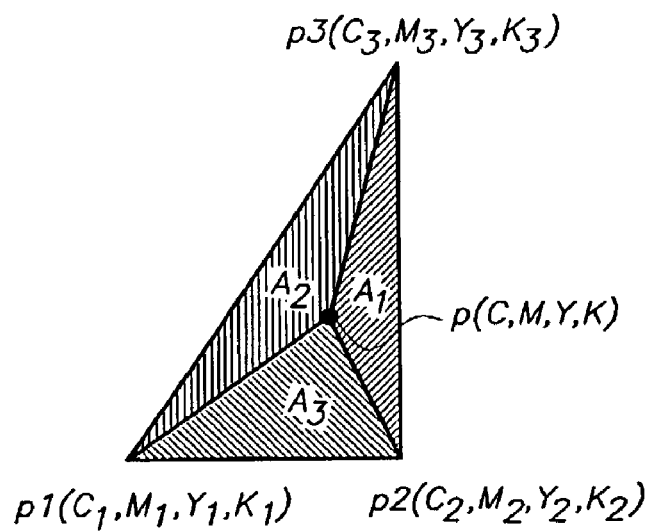
FIG. 12 shows the determining the interpolation weights.

An interpolation step can be used to determine the CMYK values for point p based upon the values in trajectory space for points p, p1, p2 and p3 and the corresponding colorant values for p1, p2 and p3. FIG. 12 shows how the interpolation weights are determined:

| | |
|---|---|
| $A_1$ | is the area of the triangle defined by p, p2 and p3 in trajectory space. |
| $A_2$ | is the area of the triangle defined by p. p1 and p3 in trajectory space. |
| $A_3$ | is the area of the triangle defined by p, p1 and p2 in trajectory space. |

The interpolation weights are equal to $$w_1'=A_1/(A_1+A_2+A_3)$$

$$w_2'=A_2/(A_1+A_2+A_3)$$

$$w_3'=A_3/(A_1+A_2+A_3))$$

$$w_1'+W_2'+W_3'=1$$

The interpolation of the cyan colorant value C from the colorants $C_1$, $C_2$ and $C_3$ obtained along the red, yellow and neutral axes is done using the following formula:

$$C=w_1'*C_1+w_2'*C_2+w_3'*C_3$$

The above graphical explanation is now supported by a numerical derivation:

The CMYK colorant values for an RGB point in tetrahedron T1 are interpolated from the CMYK colorant values along the neutral axis, the red axis, and the yellow axis. These curves are denoted by $f_{IA}$, where I stands for the ink used, and A stands for the axis used, e.g. $f_{CN}$ describes the generation of cyan along the neutral axis, $f_{KY}$ describes the generation of black along the yellow axis, etc.

A point p=(R,G,B) in tetrahedron T1 can be expressed as the sum of the three independent vectors (1,0,0), (1,1,0) and (1,1,1):

$$p=w_1*(1,0,0)+w_2*(1,1,0)+w_3*(1,1,1),$$

with $$w_1=(R-G), w_2=(G-B), w_3=3.$$

Assuming that R>0, we can reorganize the above expression as:

$$p=w_1'*R*(1,0,0)+w_2'*R*(1,1,0)+w_3'*R*(1,1,1),$$

with:

$$w_1'=(R-G)/R, w_2'=(G-B)/R, w_3'=B/R.$$

This formula has the following meaning: the point p can be expressed as the weighted sum of three trajectory points p1, p2 arid p3:
  Point p1, situated a distance R along the red axis, having the co-ordinates (R,0,0,)
  Point p2, situated a distance R along the yellow axis, having the co-ordinates (R,R,0)
  Point p3, situated a distance R along the neutral axis, having the co-ordinates (R,R,R)
  The sum of the weights $w_1'+w_2'+w_3'=1$.

These weights are called the "barycentric coordinates" of the point p=(R,G,B) in the triangle {p1, p2, p3}. The CMYK colorant values for the point p are then determined by $$I(p)=w_1'*f_{IR}(R)+w_2'*f_{IY}(R)+w3'*f_{IN}(R),$$

for

I=C,M,Y,K.

More generally, for any point $p=(R,G,B)\neq(0,0,0)$ in any of these 6 tetrahedrons:

$$w_1'=(MAX(R,G,B)-MID(R,G,B))/MAX(R,G,B)$$

$$w_2'=(MID(R,G,B)-MIN(R,G,B))/MAX(R,G,B)$$

$$w_3'=MIN(R,G,B)/MAX(R,G,B)$$

$$I(p)=w_1'*f_{IA1}(MAX)+w_2'*f_{IA2}(MAX)+w_3'*f_{IN}(MAX),$$

where A1=red, green, or blue, and A2=yellow, magenta, or cyan according to in which tetrahedron the point p is located.

The current technique allows in principle to control the colorant values along 28 curves and thus gives a large degree of control over the ink generation process. Different values of black colorant can be used for reproduction of trajectory points along the 7 axes of the trajectory space. This demonstrates that our new method enables to control in an elegant, flexible and robust manner the use of the black colorant to manage the trade-offs and constraints, as they exist in the color separation problem.

In the above described embodiment a plane is constructed in T1 which is parallel to the plane defined by the points R, Y and W, to calculate the values for the trajectory points forming the intersection p1, p2 and p3 of the plane with the red, yellow and neutral axes. It can be understood that it is not necessary that this plane has this defined direction. Theoretically any plane containing the point p and intersecting the red, yellow and neutral axis can be used. However, preferably the values of the obtained trajectory points p1, p2 and p3 are close to the value of point p in trajectory space. Slanted planes containing p may give rise to largely deviating values and colorant values for the trajectory points resulting in deviating colorant values for the given color for which colorant values need to be determined.

Preferred Method of Colorant Generation Step for Printing with Multiple Colorants having the Same Color, but Different Densities In order to reduce the graininess in halftoned image reproduction, certain printing processes rely on sets of colorants having the same hue but with different densities The use of colorants with different densities enables to reduce the contrast of the halftones and makes the graininess less apparent. We will explain that our invention can advantageously be used in combination with neutral colorants having a multiple densities or in combination with colored colorants having multiple densities.

Multiple Gray Colorants

When printing with multiple gray colorants instead of with a single black ink in order to reduce graininess, we can follow the above procedure to make first a set of CMYK separations, and then perform a colorant splitting step to split the value of the K colorant into N values for the gray colorants $K_1, \ldots, K_N$. Preferably the sum of the N colorants should stay below a certain predefined limit, because piling up too many colorants at a given pixel location may affect the printability of the separated image.

Figure 13:
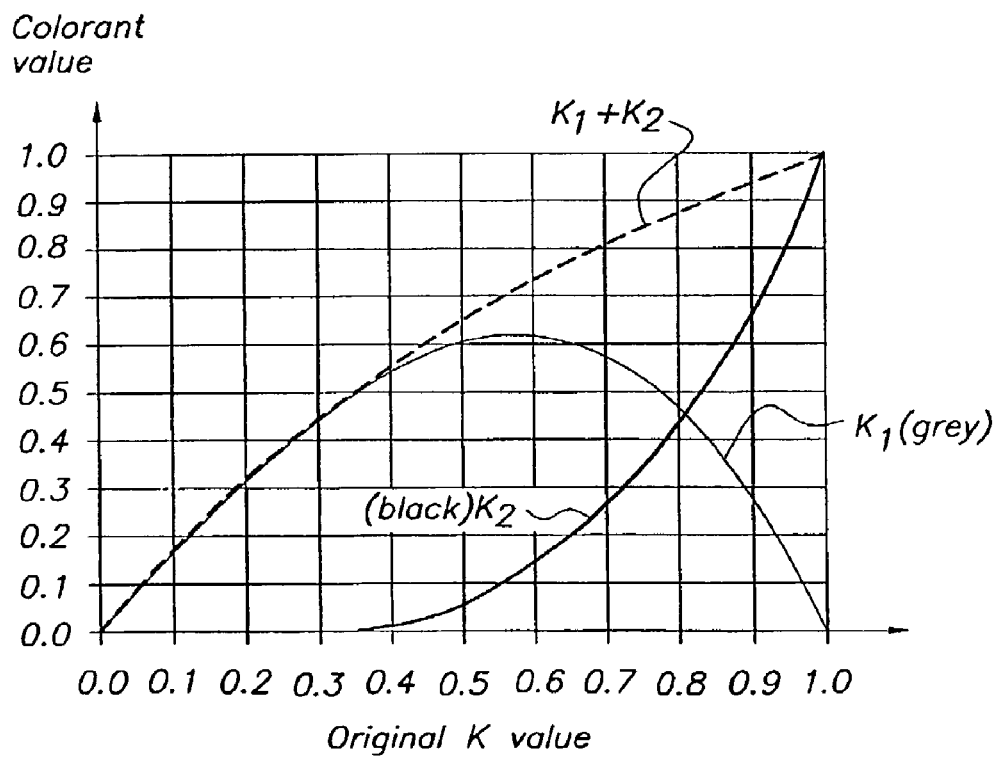
FIG. 13 illustrates the separation of K-colorant into two colorants K1 and K2 by means of colorant splitting curves.

A set of prototypical ink curves for a process with two neutral colorants—one gray $K_1$ and one black $K_2$—and a total amount of colorant limitation of $K_1+K_2=1.0$ is shown in FIG. 13.

In yet another embodiment, we do not perform an ink splitting after doing the four color separation, but make directly a (3+N)-color separation, by specifying how C,M, Y,$K_1, \ldots, K_N$ vary along the seven axes in the RGB cube and using the same interpolation method as for the 4-colour separation above. In this way we are able to specify different usage of the gray inks along the different axes, e.g. we may want a behavior along the neutral axis different from that along the color axes.

Multiple Cyan and Magenta Colorants

Light cyan and light magenta colorants are sometimes used in addition to the standard colorants to reduce graininess in inkjet printing. It is perfectly possible to use our invention in combination with the colorant-splitting method that was explained for multiple gray colorants for this purpose.

However, apart from using it to reduce graininess, the light cyan and magenta colorants can also be used to expand the printable gamut of the printing process by allowing the overprinting of light and dark colorants of the same hue. Printing the lighter colorant on top of 100% of the darker colorant of the same hue results in more saturated colors with higher densities, compared to printing with just the dark colorant.

Overprinting light and dark colorants of cyan or magenta causes no problem at the cyan point (0,1,1) or magenta point (1,0,1) of the RGB cube, because the total amount of colorant cannot exceed 200% for these colors. A problem, however, may occur in the red, green and dark neutral colors. The addition of light cyan and magenta on top of the dark cyan and magenta colorants in the presence of yellow and black colorant in these parts of the color gamut may result in a total amount of colorant i.e. the sum of colorant values that exceeds what a particular printing process can handle, for example due to limitations of the total amount of colorant that the substrate can absorb.

Therefore we outline an embodiment of our invention that allows using light cyan and magenta colorants for the purpose of reducing the graininess and expanding the printable gamut, while the restrictions on the total amount of colorant in the red, green and neutral colors are still respected. In what follows we concentrate on the case of the cyan colorants, but an identical reasoning can be made for the magenta colorants.

Figure 14:
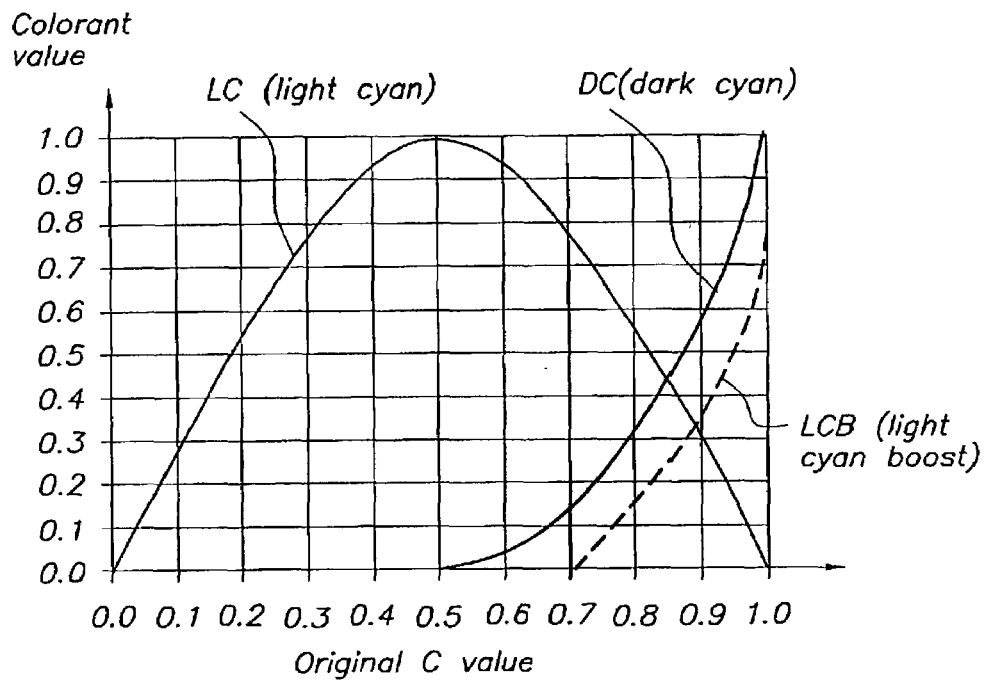
FIG. 14 depicts the separation of the original C (cyan) value into LC (light cyan) and DC (dark cyan)and shows a LCB (light cyan boost) curve.

The new method uses, in addition to the colorant splitting curves that convert the original cyan (C) into to light and dark cyan, a curve that controls an additional boost of the light cyan colorant in certain parts of the color gamut. In FIG. 14, this curve is indicated as LCB (light cyan boost). A given original cyan (C) value is split into an amount of dark cyan "dc" that is indicated by the DC curve, while the amount of light cyan "lc" is determined by the amount indicated the LC curve or the sum of the two curves LC and LCB—depending on where the color is located in the printable gamut. The amount of light cyan colorant boost is made color dependent. In practice, the light cyan colorant boost will be maximal for the color with co-ordinates (0,1,1) in the RGB intermediate space, and will be reduced for colors are either less saturated or have a different hue. Preferably a boost is only provided for colors that belong to either of the two tetrahedrons T4 and T6 indicated in FIGS. 3B and 3C that share the black to cyan axis in the RGB intermediate space. This can be exemplified by means of the following formulas:

If a color RGB belongs to tetrahedrons: T1, T2, T3 or T5, no light cyan boost is provided:

$$dc=DC(C)$$

$$lc=LC(C)$$

If a color RGB belongs to the tetrahedron: T4, a light cyan boost is provided:

$$dc=DC(C)$$

$$lc=LC(C)+(BF*(w_1'+w_2')*G)*LCB(C)$$

BF is a constant and controls the "boost factor", while $w_1'$ and $w_2'$ refer to the interpolation weights as they were defined in one of the previous embodiments. The green co-ordinate "G" in the formula for "lc" suppresses the amount of light cyan colorant boost for colors in the tetrahedron T4 that are darker, while the factor $(w_1'+w_2')$ suppresses the amount of light cyan colorant boost for colors in the tetrahedron T4 that are either less saturated or that have a hue that differs from cyan.

If color RGB belongs to tetrahedron T6, also a light cyan boost is provided:

$$dc=DC(C)$$

$$lc=LC(C)+(BF*(w_1'+w_2')*B)*LCB(C)$$

$w_1'$ and $w_2'$ refer to the interpolation weights as they were defined in one of the previous paragraphs. The blue co-ordinate "B" in the formula for "lc" suppresses the amount of light cyan colorant boost for colors in the tetrahedron T6 that are darker, while the factor $(w_1'+w_2')$ suppresses the amount of light cyan colorant boost for colors in the tetrahedron T6 that are either less saturated or that have a hue that differs from cyan.

In this way, an increase of the light cyan colorant is selectively obtained for colors in the trajectory space that correspond with, or are nearby the cyan color, while there is less or no increase of light cyan colorant in colors that are darker, more neutral, or have a hue that differs from cyan.

Take for example the RGB point with co-ordinates (0,1,1). The original cyan value C for this point is 1.0. This point is common to the tetrahedrons T4 and T6, so we can use either formula. Since for this point obviously $w_3'=0$, it is found that $w_1'+w_2'=1.0$. Using the curves in FIG. 14, and assuming that the boost factor BF equals 0.9, this results in values for the light cyan "lc" and dark cyan "dc":

$$dc=1.0$$

$$lc=0.0+(0.9*1.0*0.8)=0.72$$

Without the light cyan boost, there would have been only dark cyan in this part of the color gamut.

Multiple Cyan and Magenta Colorants

If a printer is used that is capable to print on the same pixel position more than once with the same colorant, the above method can be used to increase the density the saturated colors and expand the printable color gamut of the printer. This is achieved, for example, by selectively boosting the colorant values or amounts of colorants when printing the cyan, magenta and yellow colorants to 200%, reducing the amount of boost to 50% for the printing of red green and blue colors so that the total values of colorant do not exceed 300%, and reducing the amount of boost even more for darker and lesser saturated colors in order to respect the restrictions on the allowable total amount of colorant of the printing process.

Preferred Method of Colorant Generation Step for Printing in Combination with Colorant Component Replacement In certain instances it is desirable to use one or more colorants in addition to the standard set of CMYK colorants. A first reason for this can be to increase the stability of a particular color by rendering this color with its own specific colorant instead of relying on a correct balance between the CMYK printers. This is often the case in the package printing industry. Another argument could be to expand the printable gamut by using additional colorants having higher saturation at certain hues than can be achieved with standard CMYK colorants. An example of such a printing system is the Hexachrome (registered trade-mark) set of printing inks, which is marketed by the company Pantone (registered trade-mark) and includes bright orange and green inks. For reasons of generality and convenience, we refer in what follows to any of the additional colorants as a "complementary colorant" (CC).

In most cases a set of CMYK colorant values exists that is considered being equivalent with the complementary colorant. The "Pantone Matching System" (registered trademark), for example, provides for a large set of complementary inks the matching combinations of CMYK ink values. According to the this system the dark brown ink Pantone CVC 464, for example, is equivalent with a combination of 47% cyan, 65% magenta and 100% yellow inks.

| 100% Pantone CVC 464 | 46% C | 65% M | 100% Y | 0% K |
| --- | --- | --- | --- | --- |

We explain now that our novel separation method can be used in combination with complementary colorants. For this, we introduce the following notations:

CCR is a "colorant component replacement factor", ranging from 0.0 (no colorant component replacement) to 1.0 (100% colorant component replacement).

cc is the amount of complementary colorant that is used to print a given color.

$C_{or}$, $M_{or}$, $Y_{or}$, $K_{or}$ are the CMYK colorant values obtained using the first embodiment of our invention $C_{eq}$, $M_{eq}$, $Y_{eq}$, $K_{eq}$ are the CMYK colorant values that match 100% of the complementary colorant CC $C_{new}$, $M_{new}$, $Y_{new}$, $K_{new}$ are the CMYK colorant values after the colorant component replacement step has been performed.

The colorant component replacement operation consists of first determining the colorant component replacement factor CCR, then setting the amount of complementary ink equal to this value, and next subtracting the equivalent portion from the original CMYK colorant values. The procedure is exemplified by the following formulas:

$$m = \min(C_{or} - C_{eq}, M_{or} - M_{eq}, Y_{or} - Y_{eq}, K_{or} - K_{eq})$$

$$\text{if}(m > 0.0) CCR = 1.0 \text{ else } CCR = 1.0 + m$$

$$cc = F$$

$$C_{new} = C_{or} - CCR * C_{eq}$$

$$M_{new} = M_{or} - CCR * M_{eq}$$

$$Y_{new} = Y_{or} - CCR * Y_{eq}$$

$$K_{new} = K_{or} - CCR * K_{eq}$$

Take for example the colorant component replacement on a color of which the original ink values are 60% C, 60% M, 60% Y and 60% K, and where the complementary ink is the Pantone CVC 464 ink. The value of m in that case is −0.4 and the colorant component replacement factor CCR=0.6. The amount of complementary ink is set to 0.6 and the new CMYK values become:

$$C_{new} = 0.6 - 0.6 * 0.46 = 0.32$$

$$M_{new} = 0.6 - 0.6 * 0.65 = 0.21$$

$$Y_{new} = 0.6 - 0.6 * 1.00 = 0.00$$

$$K_{new} = 0.6 - 0.6 * 0.00 = 0.60$$

A further improvement consists of making the colorant component replacement factor dependent on the color that is to be separated. For this purpose an approach can be followed that is similar to the method of making the light colorant boost color dependent. We explain now how the red ink in the Pantone Hexachrome (registered trade mark) can be handled using this system. The specification of this ink as a function of CMYK values is:

100% Pantone Hexachrome Orange CVC 0% C 76% M 97% Y 0% K

According to our invention, the colorant component replacement is made color dependent. Since the red axis is only shared by the tetrahedrons T1 and T2 (see FIGS. 3B and 3C), no colorant replacement is done for colors that belong to the other tetrahedrons. For a color that belongs to either T1 or T2, the colorant replacement is reduced for colors that are less saturated or have a hue that differs from red. This effect is, for example, achieved by specifying a new colorant component replacement factor CCR' that is obtained from the original colorant replacements using the next formula in which w1' is the interpolation weight as defined in one of the previous embodiments of our invention:

$$CCR' = CCR * w_1'$$

Figure 15:
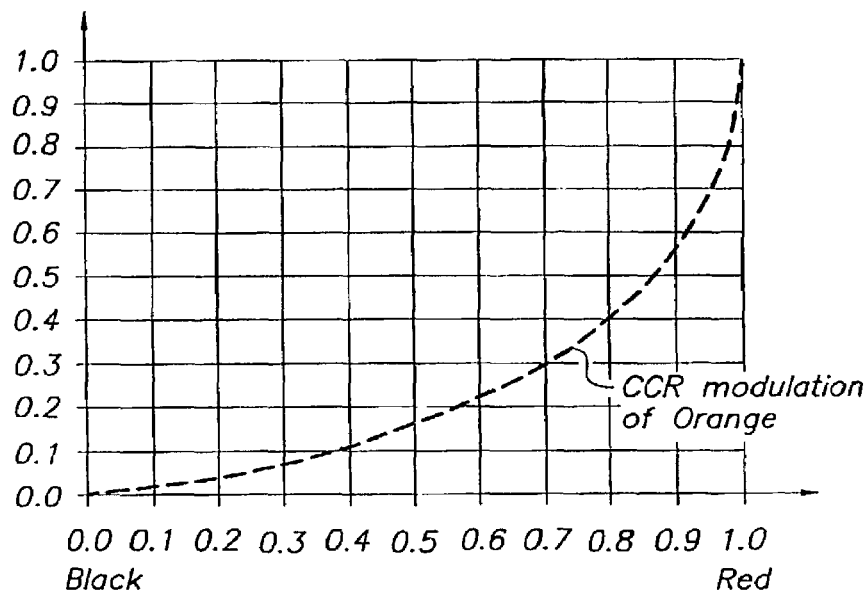
FIG. 15 gives the colorant component replacement curve to modulate the colorant component replacement as a function of the red value.

According to yet another embodiment, the colorant component replacement is modulated as a function of the value of the red component of the color by means of a colorant component modulation curve CCR_modulation(R) such as the one depicted in FIG. 15. The modulation by means of the colorant component replacement modulation curve and the modulation by the saturation and hue of the color can of course also be compounded, for example by multiplying the two modulation coefficients. The following formula shows an example of how this can be done.

$$CCR' = CCR * w_1' * (CCR\_modulation(R))$$

As described above for the multiple black-gray level components it is possible not to perform an ink splitting, color boost, under color removal (UCR) or ink replacement after doing the four color separation, but make directly a (3+N)-color separation, by specifying how C,M,Y,$X_1$, ..., $X_N$ vary along the seven axes in the PGB cube and using the same interpolation method as for the 4-colour separation above. The specification of ink behavior for C,M,Y, $X_1$, ..., $X_N$ has to include characteristics resulting in the same result obtained by color boost, under color removal, colorant replacement and color splitting after color separation.

In this way we are able to specify different usage of all the used inks for the final reproduction along the different axes, e.g. we also may want a behavior along the neutral axis different from that along the color axes.

Of course it is also possible not to include one or more of the used inks and still use a replacement or ink splitting step as mentioned above afterwards.

PREFERRED EMBODIMENT FOR THE COLOUR CORRECTION STAGE

In the previous paragraphs, we have concentrated on the separation of RGB values in the trajectory space into colorant values or colorant management step. Since the RGB values in the trajectory space have no well-defined colorimetric interpretation, an additional color correction stage or colorimetric management step is likely to be necessary for faithful reproduction of photographic images.

As FIG. 1 shows, the purpose of the color correction step is to transform a set of colorimetrically defined values (TR,TG,T) into a set of (R,G,B) values in the trajectory space that, when separated using a method according to the present invention and printed, render exactly the color represented by the colorimetric values. The colorimetrically defined values (TR,TG,TB) can, for example, be RGB tristimulus values, or sRGB values, or XIE XYZ values or even CIE L*a*b* values.

In order to achieve our goal, we use the method that we are explaining next.

Creation and Printing of a Test Chart

The first step in our new method consists of determining a number of points in the trajectory space that are a representative sampling of this space, and printing test patches that correspond with these RGB values. The sampling is preferably ordered, meaning that all the points are laid out on a three-dimensional RGB grid. Such a grid can, for example, consist of all the possible combinations of n1 values between 0.0 and 1.0 of the R co-ordinate, n2 values between 0.0 and 1.0 of the G co-ordinate, and n3 values of the B co-ordinate. This leads to n1*n2*n3 combinations of RGB colors that can be separated into colorants using one of the previous embodiments according to the invention and then printed. This could take the form of a regular grid being a ordered set of 3×3×3 "stimuli" in trajectory space as represented in FIG. 16A.

The colorimetric values in color space of the printed patches are measured with a calorimeter or a spectrophotometer, such as marketed by the company X-rite of Gretag. At this stage we have available a list with n1*n2*n3 pairs of three-dimensional co-ordinates. FIG. 16B shows the corresponding set of 3×3×3 measured "responses" in a colorimetrically defined space.

Modeling the Relation Between the Stimulus and Response Spaces

The next stage consists of mathematically modeling the relation between the stimulus and response space. We have found that the triangulation of the stimulus space offers an elegant approach to achieve this purpose. Every hexahedron or cube in the stimulus space in FIG. 16B can be subdivided into 6 tetrahedrons, much like in FIG. 3 of the pending application. As FIG. 17 demonstrates, the four vertices of every tetrahedron in the three-dimensional stimulus space map onto a corresponding set of four vertices in the three-dimensional response space and vice versa. This means that for every (non degenerate) tetrahedron a set of 3×3 linear equations exists with three by four coefficients that map exactly the co-ordinates the vertices of a tetrahedron in one space onto the vertices of the tetrahedron in the other space.

$$R = a_{00} + a_{01}*TR + a_{02}*TG + a_{03}*TB$$

$$G = a_{10} + a_{11}*TR + a_{12}*TG + a_{13}*TB$$

$$B = a_{20} + a_{21}*TR + a_{22}*TG + a_{23}*TB$$

What these equations express is what the (R,G,B) values in the trajectory space are to be in order for the printer to produce a color inside the tetrahedron which has the colorimetrically defined values (TR,TG,TB). We call these equations the "color correction equations".

The coefficients $a_{ij}$ in the above equations are easily determined from solving three sets of four equations. For example the coefficients $a_{00}$, $a_{01}$, $a_{02}$ and $a_{03}$ are determined from the next set of equations in which $TR_i$, $TG_i$ and $TB_i$ with i ranging from 0 to 3 refer to the tristimulus values of the four vertices (p1, p2, p3, p4) of a given tetrahedron while R1, R2, R3 and R4 refer to the R co-ordinates of the corresponding points of the same tetrahedron in the intermediate RGB space.

$$R1 = a_{00} + a_{01}*TR1 + a_{02}*TG1 + a_{03}*TB1$$

$$R2 = a_{00} + a_{01}*TR2 + a_{02}*TG2 + a_{03}*TB2$$

$$R3 = a_{00} + a_{01}*TR3 + a_{02}*TG3 + a_{03}*TB3$$

$$R4 = a_{00} + a_{01}*TR4 + a_{03}*TG4 + a_{03}*TB4$$

Colorimetric Correction

According to our invention, this leads to the following procedure for the separation of a color, defined as a set of color values in a color space into values of colorants. Given the (TR,TG,TB) colorimetrically defined values of a printable color in color space, so first determine to which one of the 6*n1*n2*n3 tetrahedrons this color belongs. Next use the color correction equations with the appropriate set of coefficients to calculate the (R,G,B) values in the trajectory space. Then separate the (R,G,B) color in trajectory space into colorant values in colorant space determining the values for the colorants using one of the embodiments according to the invention that were previously described in this application.

Determining to Which Tetrahedron a Printable Colour Belongs

To determine if a printable color p in color space with co-ordinates (TR,TG,TB) belongs to a tetrahedron defined by the non-coplanar points {p1, p2, p3, p4}, it is sufficient to evaluate if the point falls on the same side with regard to the four planes defined by {p2, p3, p4}, (p1, p3, p4), (p1, p2, p4) and (p1, p2, p3) as another poin of which is it is known that it belongs to the tetrahedron, such as the center of gravity of the tetrahedron. To determine if this condition is met, the four equations $A_i TR + B_i TG + C_i TB + D_i$ (i=1,2,3,4)

that correspond with these four planes are evaluated. If the evaluation of the four planar equations yields values with the same sign as the center of gravity of the tetrahedron, it means that the point belongs to the tetrahedron under consideration.

If one or more of the equations yields a value that is different, it means that the color (TR,TG,TB) lies outside the tetrahedron under consideration and that a different tetrahedron is to be searched to which the point belongs. It is possible to significantly speed up this search by considering that, every time a point (TR,TG,TB) is found to be at the "wrong" side of a plane of a tetrahedron under consideration, this means that all the other tetrahedrons of which the points fall on this "wrong" side should not be further considered as candidates. For the next candidate tetrahedron, preferably the neighbor tetrahedron is selected of which all the points are on the "right" sides of the planes of the previous tetrahedron under consideration. Using this approach the search quickly converges to the tetrahedron to which the point belongs.

Dealing with Non Printable Colors

In the previous derivation it was implicitly assumed that the color that is to be separated is indeed printable and that a tetrahedron can be found in the colorimetric response space to which the color belongs. Sometimes, however, an original image may contain colors that are not printable. In that case the color correction and separation step should be preceded by a "color gamut mapping and or clipping" step. Most of these gamut clipping and mapping strategies rely on an explicit representation of the color gamut. Since our new color separation method includes a triangulation of the printable gamut, such a representation is already implicitly present and it can be easily used for the purpose of gamut mapping and clipping. A description of the state-of-the-art methods to do color gamut mapping is beyond the scope of this application, and can be found in the article "Optimizing Gamut Mapping: Lightness and hue adjustments" by Patrick G. Herzog and Hendrik Buring, the article "Applying Non-linear Compression to the Tree-dimensional Gamut Mapping" by Naoya Katoh and Masahiko Ito, and the article "General Purpose Gamut Mapping Algorithms: Evaluation of Contrast Preserving Rescaling Functions for color Gamut Mapping" by Gustav J. Braun and Mark D. Fairchild, all published in the Journal of Imaging Science and Technology, Volume 44, Number 4, July/August 2000. Another article is "Gamma-Compression Gamut Mapping Method Based on the Concept of Image-to-Device" by Hung-Shing Chen, Minoru Omamiuda and Hiroaki Kotera, published in the Journal of Imaging Science and Technology, Volume 45, Number 2, March/April 2001.

Non Ordered Set of Stimuli

Several variations exist on the described color correction procedure. It is, for example not strictly required that the set of "stimulus" colors in the test chart be ordered. If such is the case, a Delaunay triangulation scheme can be used to calculate the tetrahedrons to model the stimulus and response spaces of the printer.

Use of Polynomials for Colour Correction

Besides using triangulation techniques, it is also possible to use polynomials to achieve color correction. A first solution consists of using a set of three higher order polynomials to transform (TR,TG,TB) into (R,G,B) values. An example of such a polynomial is presented in the next formula:

$$R=a_{00}+a_{01}TR+a02TG+a_{03}TB+a_{04}TR.TG+a_{05}TR.TB+a_{06}TG.TB+a_{07}TR.TG.TB$$

$$G=a_{10}+a_{11}TR+a_{12}TG+a_{13}TB+a_{14}TR.TG+a_{15}TR.TB+a_{16}TG.TB+a_{17}TR.TG.TB$$

$$B=a_{20}+a_{21}TR+a_{22}TG+a_{03}TB+a_{04}TR.TG+a_{05}TR.TB+a_{06}TG.TB+a_{07}TR.TG.TB$$

The coefficients $a_{ij}$ are determined by using a linear regression technique on the list with stimulus-response pairs obtained from the test chart. The stimuli can be ordered or non-ordered in this case. If more precise color correction is required, higher order terms are added to the polynomial.

Another way of using polynomials for color corrections starts from an ordered set of n1*n2*n3 stimuli in the trajectory space. Such a set defines (n1−1)*(N2−1)*(n3−1) hexahedrons. For each hexahedron a set of three equations can be defined that predicts the colorimetric values (TR,TG,TB) from the (R,G,B) values in the trajectory space and has the following form:

$$TR=a_{00}+a_{01}R+a_{02}G+a_{03}B+a_{04}R.G+a_{05}R.B+a_{06}G.B+a_{07}R.G.B$$

$$TG=a_{10}+a_{11}R+a_{12}G+a_{13}B+a_{14}R.G+a_{15}R.B+a_{16}GB+a_{17}R.G.B$$

$$TB=a_{20}+a_{21}R+a_{22}G+a_{23}B+a_{24}R.G+a_{25}R.B+a_{26}G.B+a_{27}R.G.B$$

The coefficients $a_{ij}$ are unique for each hexahedron and are such that the equations give exact predictions for its eight vertices. They are calculated by solving three sets of 8×8 linear equations. For example, the coefficients $a_{0j}$ are calculated from the $TR_1$ and $(R_j,G_j,B_j)$ values corresponding to the eight vertices of a given hexahedron by solving the following set of linear equations:

$$TR1=a_{00}+a_{01}R1+a_{02}G1+a_{03}B1+a_{04}R1.G1+a_{05}R1.B1+a_{06}G1.B1+a_{07}R1.G1.B1$$

$$TR2=a_{00}+a_{01}R2+a_{02}G2+a_{03}B2+a_{04}R2G2+a_{05}R2.B2+a_{06}G2B2+a_{07}R2.G2.B2$$

$$TR3=a_{00}+a_{01}R3+a_{02}G3+a_{03}B3+a_{04}R3.G3+a_{05}R3.B3+a_{06}G3.B3+a_{07}R3.G3.B3$$

$$TR4=a_{00}+a_{01}R4+a_{02}G4+a_{03}B4+a_{04}R4.G4+a_{05}R4.B4+a_{06}G4.B4+a_{07}R4.G4.B4$$

$$TR5=a_{00}+a_{01}R5+a_{02}G5+a_{03}B5+a_{04}R5.G5+a_{05}R5.B5+_{06}G5.B5+a_{07}R5.G5.B5$$

$$TR6=a_{00}+a_{01}R6+a_{02}G6+a_{03}B6+a_{04}R6.G6+a_{05}R6.B1+a_{06}G6.B6+_{07}R6.G6.B6$$

$$TR7=a_{00}+a_{01}R7+a_{02}G7+a_{03}B7+a_{04}R7.G7+a_{05}R7.B7+a_{06}G7.B7+a_{07}R7.G7.B7$$

$$TR8=a_{00}+a_{01}R8+a_{02}G8+a_{03}B8+a_{04}R8.G8+a_{05}R8.G8+a_{06}G8.B8+a_{07}R8.G8.B8$$

Color correction is achieved by first determining to which hexahedron a color (TR,TG,TB) belongs, and then searching what (R,G,B) values produce the desired color (TR,TG,TB). For this purpose three-dimensional numerical Newton Raphson iteration can be used or, alternatively, the above set of equations can be converted into a sixth degree one-dimensional polynomial of which the six roots are determined using one of the robust root-finding techniques as presented in the book "Numerical Recipes in C" by William E. Press, Brian P. Flannery, Saul Teukolsky and William T. Vetterling and published by Cambridge University Press. Since the approach resembles the use of "three-dimensional Neugebauer equations with localized coefficients", we refer for the details to the article "Inversion of the Neugebauer Equations" by Mahy and Delabastita.

A disadvantage of the polynomial approach to do color correction is that a separate algorithm is necessary to obtain an explicit representation of the printable color gamut for the purpose of gamut mapping and clipping. Another disadvantage is that no straightforward search algorithms exist that enable to find to which hexahedron a color (TR,TG,TB) belongs. A possible—indirect—solution is to first find to which tetrahedron the color belongs using the method in another embodiment of pending application. The hexahedron to which this tetrahedron belongs is also the one to which the color belongs.

Other Preferred Embodiments

Figure 18:
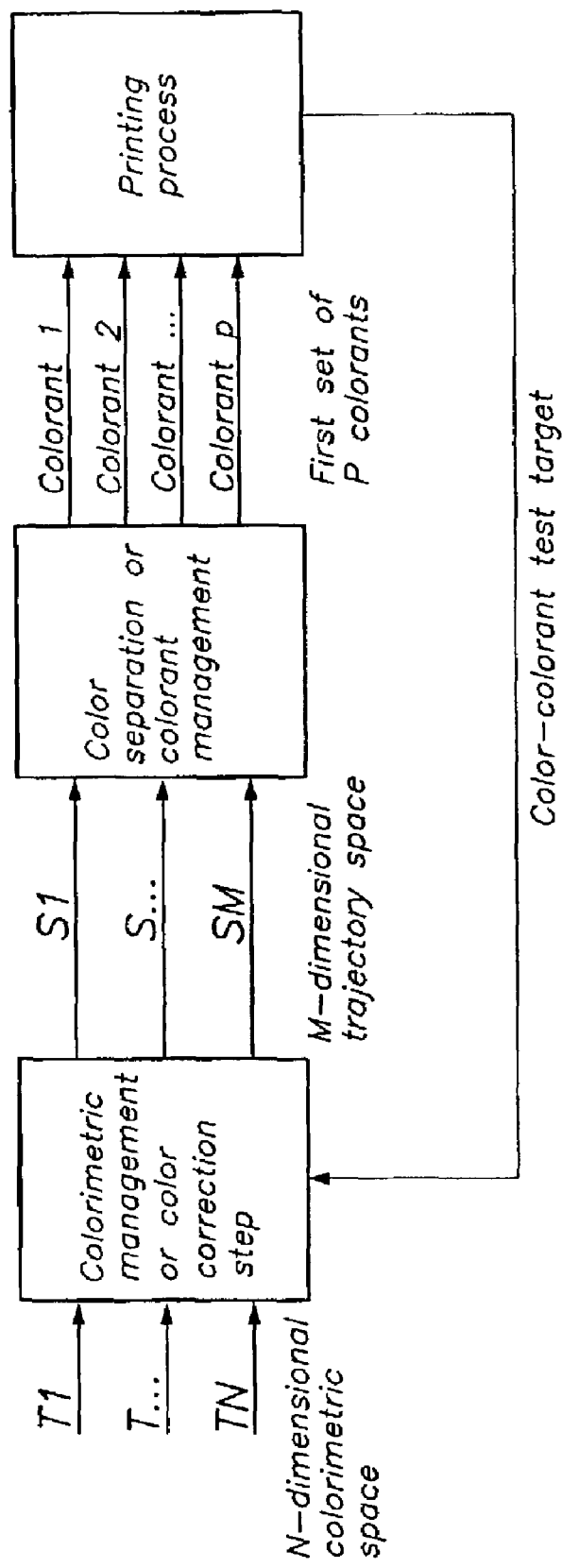
FIG. 18 gives a first generalized separation scheme according of an embodiment of the new color separation.
Figure 19:
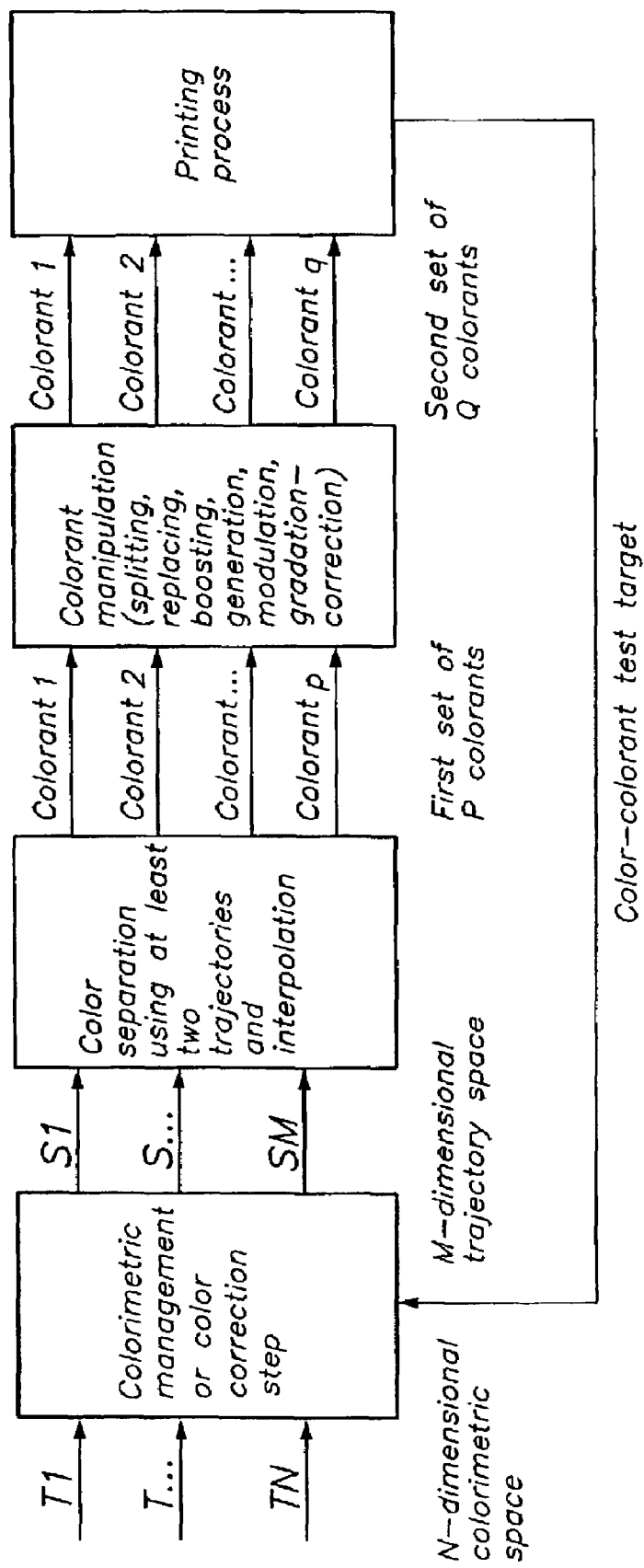
FIG. 19 gives a second generalized separation scheme according of an embodiment of the new color separation.

Besides the ones discussed in our preferred embodiments, many more variations also exist to manipulate colorants as a function of the original CMYK colorants or the position in the intermediate RGE color space, all of which fall within the scope and the spirit of our invention. For the purpose of clarity and completeness, we have included FIGS. 18 and 19, which give an overview of two additional embodiments of our new separation technique. In FIGS. 18 and 19 the color spaces were generalized and comprise spaces with a number of dimensions that is different from three. An example of such a color space could, for example, be the spectral representation of a color. Specifically mentioned to be one of the embodiments is the conditioning of the gradation of the colorant channels by means or one-dimensional functions so that the colors produced by the colorant generation step are more uniformly distributed.

While the present invention will hereinafter be described in connection with preferred embodiments thereof, it will be understood that it is not intended to limit the invention to those embodiments.

Alternative Embodiments

In the above preferred embodiments the trajectories along which ink behavior is defined consist of seven different trajectories or axes in the trajectory space: The neutral axis, the red axis, the green axis, the blue axis, the yellow axis, the magenta axis and the cyan axis. These is a specific method using seven trajectories dividing the trajectory space in six different tetrahedra using straight lines along specified directions.

However, it is clear to a person skilled in the art that the trajectories along which ink behavior is defined could be straight lines having other directions. These lines can possible divide the trajectory space into tetrahedra having orientations differing from these of the preferred embodiment.

The number of trajectories is also variable. It is possible using only two trajectories, e.g. in a system using only two colors wherein the colorimetric space can be considered as two-dimensional. It is also clear that the number of trajectories has no upper limit. By defining the ink behavior along more trajectories, the color separation step will become more accurate. Tough it is clear chat the choice of the number of trajectories is a trade-off between accurate description of ink behavior over trajectory space and keeping the amount of data and decision steps in determining the resulting colorant values for a given color in trajectory space in control.

Hitherto all trajectories are described as being straight lines or axis, however this is no requirement. When defining the ink behavior along two- or three-dimensional curves it is also possible to determine trajectory points having a set of values in trajectory space with corresponding colorant values in colorant space and to determine color separation for a given color using these values by e.g. interpolation.

The term trajectory includes al possible trajectories and is clearly not limited to straight lines or two dimensional curves.

In order to allow easy determination of the colorant values for a given color in trajectory space the trajectories can have a common point of intersection but this is not necessary. Methods determining colorant values from non-intersecting trajectories can be constructed. A possible method could use e.g. the defined colorant values from four trajectory points lying on four parallel trajectories forming the ribs of a geometrical cubic prism. An interpolation could be made including the values and corresponding colorant values of the four trajectory points.

To use the method a dedicated apparatus can be constructed for executing the steps according to the present invention. More conveniently a computer program is used to execute the steps of the method on a computing device such as e.g. a Personal computer or the like. Accordingly, the present invention includes a computer program product which provides the functionality of any of the methods according to the present invention when executed on a computing device.

Having described in detail preferred and several alternative embodiments of the current invention, it will now be apparent to those skilled in the art that numerous modifications can be made therein without departing from the scope of the invention as defined in the appending claims.

The invention claimed is:

1. Method for separating a color, defined as a set of color values in a color space into colorant values (C1, C2, ..., CN), for N colorants in colorant space comprising the steps of:
   converting said set of color values in a color correction step into a set of values defining said color in a trajectory space;
   defining in said trajectory space at least two trajectories comprising trajectory points (px), each said trajectory point (px) having:
   a set of values in trajectory space and
   corresponding colorant values ($C1_x, C2_x, ... CN_x$) for said N colorants in colorant space for said set of values of said trajectory point,
   determining for said color said colorant values (C1, C2, ... CN) for said N colorants using an interpolation technique based upon:
   said set of values in trajectory space for said color,
   said set of values in trajectory space and their corresponding colorant values ($C1_x, C2_x, ... CN_x$) for said N colorants ot at least two trajectory points (px).

2. The method according to claim 1 wherein said trajectory space is three-dimensional.

3. The method according to claim 2 wherein the number of said trajectories is equal to seven.

4. The method according to claim 1 wherein at least one of the trajectories is a straight line.

5. The method according to claim 4 wherein the trajectories comprise at least one of the following straight lines:
   the line connecting black to white;
   the line connecting black to yellow;
   the line connecting black to magenta;
   the line connecting black to cyan;
   the line connecting black to red;

the line connecting black to green; or the line connecting black to blue.

6. The method according to claim 1 wherein said interpolation technique further comprises the following steps:

dividing said trajectory space in which said trajectories are defined into non-overlapping sub-volumes spanned by said trajectories, determining the location of said color (p) in one of said sub-volumes, determining from said location at most one trajectory point (px) on each of said trajectories spanning said sub-volume, and expressing said colorant values for said color as a function of the colorant values ($C1_x, C2_x, \ldots CN_x$) corresponding to said trajectory points (px) determined in the previous step.

7. The method according to claim 6 wherein said function is a weighted mean.

8. The method according to claim 7 wherein weights of said weighted mean are barycentric co-ordinates of the color in a triangle containing said color location (p) and said triangle being specified by three trajectory points (p1, p2, p3), one on each trajectory spanning said tetrahedron.

9. The method according to claim 8 wherein said triangle is parallel to a tetrahedron plane opposite to an intersection point of the trajectories spanning a tetrahedron.

10. The method according to claim 6 wherein said trajectories are straight lines and said sub-volumes are tetrahedra spanned by these lines.

11. The method according to claim 10 wherein each tetrahedron (T1, T2, ..., T6) contains the points representing black and white in trajectory space.

12. The method according to claim 1 wherein said N colorants are Cyan (C), Magenta (H), Yellow (Y) and Black (K).

13. The method according to claim 1 wherein said N colorants are Cyan (C), Magenta CM), Yellow CYL. Black (K), light Magenta (LM) and light Cyan (LC).

14. The method according to claim 1 wherein the N colorants are Cyan (C), Magenta (M), Yellow CY), Black (K), orange (O) and green (C).

15. The method according to claim 1 further comprising the step of replacing at least partially at least one of the values of said N colorants determined for said color by at least one value of a replacement colorant.

16. The method according to claim 15 wherein the replacement of at least one amount of N colorants is color dependant.

17. The method according to claim 1 wherein at least one of said determined colorant values is corrected by means of a one-dimensional gradation correction step.

18. The method according to claim 1 wherein the color correction step is based on a triangulation of a set of calibration points that is ordered in said trajectory space.

19. The method according to claim 1 wherein the color correction step is based on a triangulation of a set of calibration points that is non-ordered in said trajectory space.

20. The method according to claim 1 wherein the color correction step is obtained by means of at least one polynomial that predicts the values, in the trajectory space from the set of corresponding values in said color space.

21. The method according to claim 1 wherein color correction is obtained by inverting at least one polynomial that predicts the set of values for the color in said color space from the corresponding values in said trajectory space.

* * * * *

UNITED STATES PATENT AND TRADEMARK OFFICE
CERTIFICATE OF CORRECTION

PATENT NO. : 7,265,870 B2 Page 1 of 1
APPLICATION NO. : 10/300162
DATED : September 4, 2007
INVENTOR(S) : Koen Vande Velde and Paul Delabastita It is certified that error appears in the above-identified patent and that said Letters Patent is hereby corrected as shown below:

Please amend claims 13 and 14 as follows:

13. The method according to claim 1 wherein said N colorants are Cyan (C), Magenta ~~(CM)~~ (M), Yellow ~~(CYL)~~ (Y), Black (K), light Magenta (LM) and light Cyan (LC).

14. The method according to claim 1 wherein the N colorants are Cyan (C), Magenta (M), Yellow ~~(CY)~~ (Y), Black (K), orange (O) and green ~~(C)~~ (G).

Signed and Sealed this

Tenth Day of June, 2008

JON W. DUDAS
*Director of the United States Patent and Trademark Office*

UNITED STATES PATENT AND TRADEMARK OFFICE
CERTIFICATE OF CORRECTION

PATENT NO. : 7,265,870 B2 Page 1 of 1
APPLICATION NO. : 10/300162
DATED : September 4, 2007
INVENTOR(S) : Koen Vande Velde and Paul Delabastita It is certified that error appears in the above-identified patent and that said Letters Patent is hereby corrected as shown below:

Please amend claims 13 and 14 as follows:

Column 22, lines 1-3 should read
    13. The method according to claim 1 wherein said N colorants are Cyan (C), Magenta (M), Yellow (Y), Black (K), light Magenta (LM) and light Cyan (LC).

Column 22, lines 4-6 should read
    14. The method according to claim 1 wherein the N colorants are Cyan (C), Magenta (M), Yellow (Y), Black (K), orange (O) and green (G).

This certificate supersedes the Certificate of Correction issued June 10, 2008.

Signed and Sealed this

Fifteenth Day of July, 2008

JON W. DUDAS
*Director of the United States Patent and Trademark Office*